Dec. 17, 1929.  G. S. KECK  1,740,178
DIRIGIBLE HEADLIGHT
Filed April 6, 1927
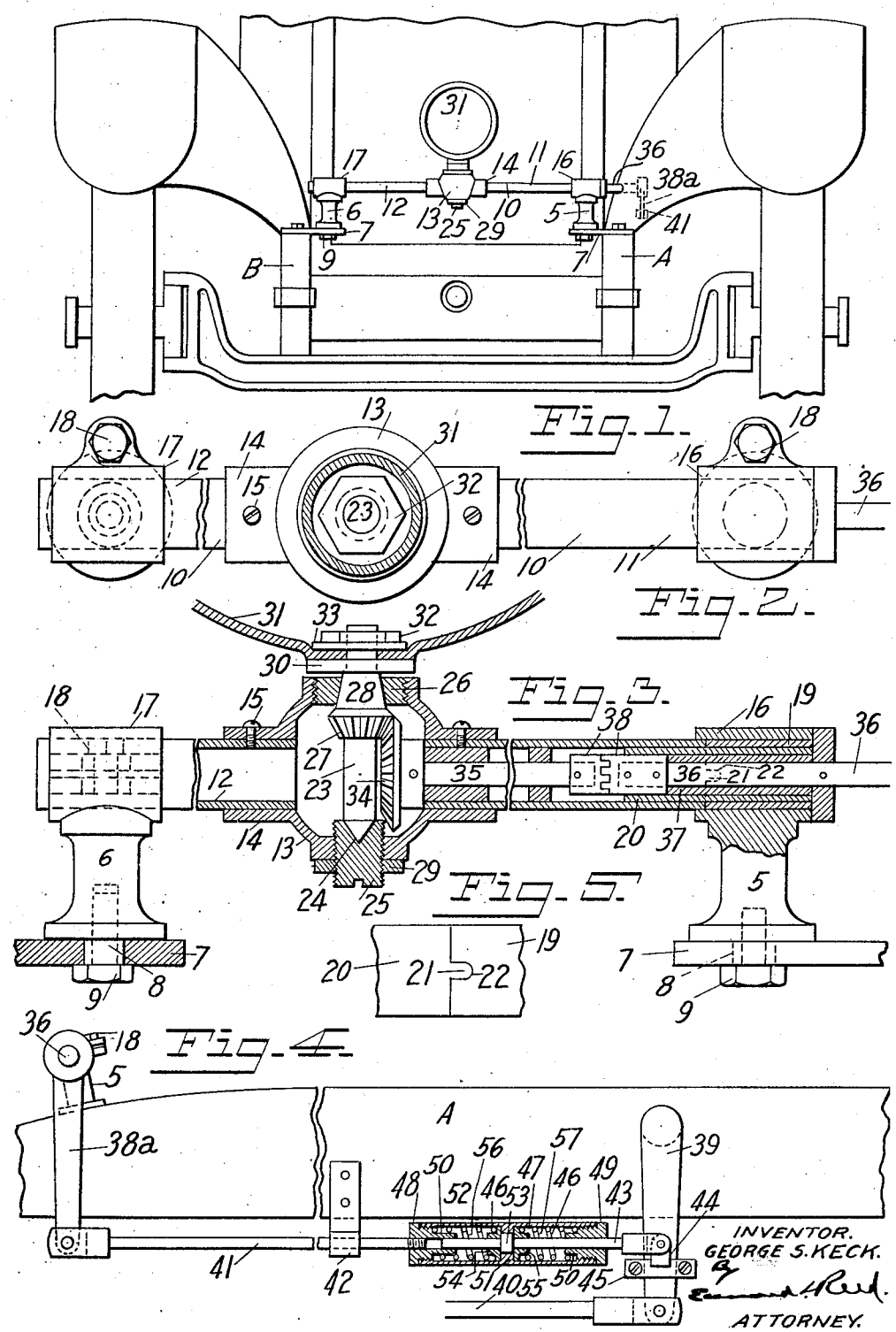
INVENTOR.
GEORGE S. KECK.
ATTORNEY.

Patented Dec. 17, 1929

1,740,178

UNITED STATES PATENT OFFICE

GEORGE S. KECK, OF PASADENA, CALIFORNIA, ASSIGNOR TO PILOT RAY CORPORATION, OF WILMINGTON, DELAWARE, A CORPORATION OF DELAWARE

DIRIGIBLE HEADLIGHT

Application filed April 6, 1927. Serial No. 181,327.

This invention relates to dirigible headlights and the present application is in part a division of the application for patent filed by me February 23, 1927, Serial No. 170,085.

One object of the invention is to provide a supporting and operating mechanism for an automobile headlight which will be compact in its arrangement and of a neat attractive appearance, and in which the operating mechanism will be concealed from view.

A further object of the invention is to provide a supporting and operating device of such a character that the headlight and the parts immediately connected therewith may be moved to a position in which they will not interefere with the hand cranking of the automobile.

A further object of the invention is to provide an operative connection between the headlight and the steering mechanism which will prevent vibrations and minor movements of the steering mechanism from being transmittted to the headlight.

A further object of the invention is to provide a supporting and operating mechanism which will be simple in its construction and operation and which may be produced at a low cost.

Other objects of the invention will appear as the device is described in detail.

In the accompanying drawings Fig. 1 is a front elevation of an automobile showing my invention applied thereto; Fig. 2 is a plan view of a headlight supporting and operating mechanism embodying my invention, with the lamp casing in section; Fig. 3 is a longitudinal sectional view of the same, partly in elevation; Fig. 4 is a side elevation of the connection between the headlight mechanism and the steering mechanism; and Fig. 5 is a detail of the connection between the two parts of the operating shaft.

In these drawings I have illustrated one embodiment of my invention and have shown the same as comprising a support for a single headlight to be arranged in front of the automobile radiator, but it will be understood that the device may take various forms and that various parts thereof may be used in connection with installations embodying two headlights.

In that particular embodiment of the invention here illustrated the supporting structure as a whole comprises two supporting members, 5 and 6, which, in the present instance, are mounted on the side members of the automobile frame, these frame members being designated, respectively, as A and B. The supporting members may be secured to the frame in any suitable manner and, in the present instance, they are carried by brackets 7 which are secured to the tops of the frame members by bolts, or otherwise. Each supporting member has a boss 8 extending through an opening in one of the brackets, and a screw 9 is threaded into the boss and serves to secure the supporting member to the bracket and to the frame. Extending between and supported by the supporting members 5 and 6 is a transverse member 10, which is here shown as comprising two short tubular sections 11 and 12 connected one to the other by a housing or headlight supporting head 13. This housing has at its opposite sides integral bosses 14 into which the ends of the tubular members 11 and 12 extend and within which they are firmly held, preferably by pressing the same into the respective bosses and securing them therein by screws 15. This transverse member is movably connected with the two frame members A and B. Preferably the transverse member is pivotally mounted at one end on the adjacent frame member and is detachably mounted at its other end on the other frame member. The pivotal connection between the transverse member and the one frame member may take various forms and the transverse member may move about either a horizontal axis or a vertical axis, but, as here shown, one supporting member, 6, is pivotally mounted on the frame member for movement about a vertical axis, the boss 8 thereof being rotatably mounted in the bracket 7 to permit of this movement. The transverse member 10 is so supported by the supporting member 6 that it may have longitudinal movement with relation thereto but will be held normally against such movement. In the present construction, both supporting members are provided at their upper ends with tubular portions 16 and 17 to support the transverse member, these tubular portions being, preferably, in the form of split sleeves. The outer end of the tubular section 12 of the transverse member extends through the split sleeve 17 of the supporting member 6, and is securely clamped therein by means of a screw 18. When so clamped the transverse member as a whole will be held rigidly against longitudinal movement with relation to the supporting member but when the screw is loosened the transverse member may have sliding movement in the supporting member.

The other end of the transverse member 10 may be detachably connected with the other frame in any desired manner but, in the present construction, the longitudinal movement of the transverse member is utilized to establish or interrupt the supporting connection between the transverse member and the supporting member 5. For this purpose I have mounted in the tubular upper portion or split sleeve 16 of the supporting member 5 a tubular member or hollow bar 19, the inner end of which, in the present instance, terminates within the split sleeve and a short distance from the inner end thereof. Mounted within the tubular bar 19 is a second tubular member or sleeve 20, the inner end of which extends some distance beyond the inner end of the split sleeve 16 of the supporting member. The inner sleeve 20 is of such a diameter that it will enter the end of the tubular section 11 of the transverse member 10, thus permitting this transverse member to be moved onto and off of the sleeve 20 by imparting longitudinal movement to the transverse member. Preferably the end of the section 11 of the transverse member extends a short distance into the split sleeve 16 and the joint between the section 11 and the tubular bar 19 is thus concealed. It will be apparent that by loosening the screw 18 of the split sleeve 17 of the supporting member 6 the transverse member 10 may be moved in the direction of its length a distance sufficient to withdraw the same from the projecting end of the sleeve 20 and may then be moved about the axis of the connection of the supporting member 6 with the frame. When the transverse member is returned to its normal position it is again slipped over the end of the sleeve 20 and the screw 18 tightened down to secure it in that position. The transverse member is adjustable about its longitudinal axis to enable the headlight to be tilted to direct the light toward the roadway. To insure the restoration of the headlight to its proper inclination after the transverse member has been disconnected and moved about its axis I have provided the outer end of the section 11 of the transverse member with one or more projections or tongues 21 adapted to enter corresponding recesses 22 in the end of the tubular bar 19. The tubular bar 19 is not displaced when the transverse member is disconnected from the supporting member 5 and consequently when the connection between the transverse member and supporting member is re-established the projections 21 are caused to enter the recesses 22, thus insuring the restoration of the headlight to the proper angle of inclination.

The headlight is supported upon the housing or head 13 and this head preferably has mounted therein a vertical shaft 23, the lower end of which is seated in a recess or bearing 24 in a cap or plug 25 in the bottom of the head, and has its upper portion journaled in a bearing 26 in the upper part of the head, the bearing being here shown as a cap threaded into the head. Preferably the bearing 26 has a tapered opening in which the shaft is journaled, and, in the present construction, a beveled pinion 27 is rigidly secured to the shaft and has a tapered hub portion 28 which is rotatably mounted in the bearing. The lower end of the shaft and its bearing 24 are also tapered, and the plug 25 is screw threaded into the head 13, so that by adjusting the plug 25 the shaft may be properly adjusted with relation to its bearings. A lock nut 29 serves to retain the plug in its adjusted position. Mounted on the shaft 23 above the bearing 26 is a collar 30 which rests upon the hub 28 of the pinion 27. The shaft 23 extends beyond this collar through an opening in the lower portion of the casing 31 of the headlight and has its upper end threaded to receive a nut 32 and a washer 33 by means of which the headlight casing may be firmly clamped between the collar 30 and the nut and will thus be secured to the shaft without interfering with the rotation of the shaft.

The beveled pinion 27 on the shaft 23 meshes with a second beveled pinion 34 carried by a shaft 35 journaled in the tubular section 11 of the transverse member. This shaft is connected through suitable actuating devices with the steering mechanism of the automobile but in order that this connection may be interrupted when the transverse member is disconnected from the supporting member 5, the shaft 35 is of a length less than the length of the section 11 of the transverse member and a second shaft 36 is journaled in a tubular bearing 37 in the sleeve 20 and has its inner end detachably connected with the shaft 35. The connection between the shafts 35 and 36 is of such a character that it will be interrupted by the longitudinal movement of the transverse member and, as here shown, the adjacent ends of the two shafts have secured thereto connecting member or clutches 38 having longitudinally extending teeth which will be moved into or out of interlocking engagement by the longitudinal movement of the shaft 35 with the transverse member. The outer end of the shaft 36 extends beyond the supporting member 5 and through the adjacent fender and has secured thereto a suitable actuating device, such as a crank arm 38ª, which may be connected with the steering mechanism in the usual or any suitable manner. Preferably the connection of the operating mechanism for the headlight with the steering mechanism is of such a character that it will prevent the transmission of vibrations and minor movements of the steering mechanism to the headlight. In the present construction, the crank arm 38ª is connected with a rock arm or swinging lever 39 which forms a part of the usual steering mechanism of an automobile and which is connected with the steering wheels of the automobile by a rod 40. In the arrangement here shown I have connected the crank arm 38 with the swinging lever 39 by a connecting rod comprising a part 41 pivotally connected with the crank arm 38ª and slidably mounted in a bearing bracket 42 carried by the adjacent frame member of the automobile. The connecting rod further comprises a second part 43 pivotally connected with a swinging lever 39. As here shown, the part 43 of the connecting rod is pivotally mounted on a bracket 44 carried by a clamp 45 which serves to secure it to the lever 39. The two parts 41 and 43 of the connecting rod are connected one to the other by a yieldable device 46. There is necessarily more or less frictional resistance to the movements of the headlight and of its operating mechanism and the yieldability of the device 46 is so proportioned to this resistance that it will yield under the influence of such vibrations or such minor movements as may be imparted to the swinging lever by the wheels of the automobile, thus absorbing these vibrations and preventing the movements from being transmitted to the headlight. When a substantial movement is imparted to the swinging lever, by the steering mechanism itself, this movement will be transmitted from one part of the connecting rod to the other and to the headlight operating mechanism, thus causing the headlight to be turned in accordance with the movement of the steering mechanism. The yieldable device may be of any suitable character. As here shown, it comprises a tubular member 47 which is rigidly secured to the part 41 of the connecting rod and in effect forms a part thereof. This tubular member is closed at its ends by screw-threaded plugs 48 and 49 which are provided with inwardly extending bosses or stops 50. The tubular member or sleeve has near its center an inwardly extending rib 51 which constitutes a stop and provides the tubular member with a reduced central opening. A plunger 52 is rigidly connected with the other part, 43, of the connecting rod so as to form in effect a part thereof and is slidably mounted in the end walls or plugs 48 and 49 of the tubular member. This plunger has an enlarged portion 53 which is slidably mounted in the reduced opening in the sleeve. Loosely mounted on the plunger are collars 54 and 55 which normally abut against the respective sides of the part 53 of the plunger and are of such a diameter that they will overlap the adjacent ends of the inwardly extending rib or stop 51 in the sleeve. Coiled about the plunger are springs 56 and 57 which are confined respectively between the end plug 48 and the collar 54 and between the end plug 49 and the collar 55. It will be apparent that if the plunger is moved forwardly with relation to the sleeve the enlarged portion thereof will engage the collar 54 and compress the spring 56 until the collar engages the projecting end or boss 50 of the plug 48, which engagement will establish a positive connection between the plunger and the tubular member and cause the operation of the headlight mechanism. If the plunger is moved in the opposite direction the spring 57 will likewise be compressed. Thus the plunger, and consequently the steering mechanism, can have minor movements in either direction which will not be imparted to the headlight mechanism but any material movements of the plunger will be transmitted to the headlight mechanism.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a dirigible headlight mechanism, a tubular member adapted to extend transversely to the frame of an automobile, means for pivotally and slidably connecting one end of said transverse member with said frame and for holding the same normally against sliding movement, means controlled by the sliding movement of said transverse member for detachably connecting the other end thereof with said frame, a headlight pivotally mounted on said transverse member, operating mechanism for said headlight comprising a shaft mounted in said tubular transverse member, a second shaft supported independently of and extending into said tubular transverse member, and means controlled by the longitudinal movement of said transverse member for connecting and disconnecting said shafts.

2. In a dirigible headlight mechanism, supporting members having means for mounting the same on the frame of an automobile, one of said members being capable of pivotal movement, a tubular transverse member, means for slidably connecting said transverse member with said movable supporting member and for holding the same normally against sliding movement, the other of said supporting members having a transversely extending tubular portion, a tube mounted in said tubular portion of said supporting member, means for clamping the tubular portion of said supporting member about said tube, the inner end of said tube terminating within the inner end of said tubular portion of said supporting member, a sleeve mounted within said tube and projecting beyond the inner end thereof to receive the adjacent end of said transverse member, a headlight pivotally mounted on said transverse member, and operating mechanism for said headlight carried by said transverse member.

3. In a dirigible headlight mechanism, supporting members having means for mounting the same on the frame of an automobile, one of said members comprising a split sleeve movable about a vertical axis, a tubular transverse member having one end extending through said split sleeve and held normally against movement with relation thereto, the upper portion of the other of said supporting members comprising a split sleeve, a tube mounted within the last mentioned split sleeve, a sleeve mounted within said tube and extending beyond the inner end thereof and adapted to enter said tubular transverse member, a headlight pivotally mounted on said transverse member, and operating mechanism for said headlight comprising shafts mounted respectively in said tubular transverse member and said sleeve and detachably connected one to the other.

4. In a dirigible headlight mechanism, a tubular member, means for supporting said tubular member in a position transverse to the frame of an automobile, a hollow lamp supporting head carried by said supporting member and having a bearing mounted in the lower portion thereof for axial adjustment with relation thereto, a bearing in the upper portion of said head, a shaft journaled in said bearings, held against axial movement with relation to said lower bearing and extending above said upper bearing, means for securing a headlight to the upper end of said shaft independently of said head, a shaft journaled in said tubular member, means for operatively connecting the last mentioned shaft with the first mentioned shaft, and means for operatively connecting the last mentioned shaft with the steering mechanism of said automobile.

5. In a dirigible headlight mechanism, a tubular member adapted to extend transversely to the frame of an automobile and comprising a lamp supporting head, a bearing member mounted in the lower portion of said lamp supporting head for axial adjustment with relation thereto and provided with a tapered bearing socket, said head also having a tapered bearing at the upper end thereof, a shaft having a tapered end seated in the lower bearing member and having a tapered part extending through said upper bearing, a collar mounted on said shaft above said head, a lamp having an apertured portion to receive the upper part of said shaft, a nut to clamp said portion of said lamp against said collar, a shaft journaled in said tubular transverse member extending transversely to the first mentioned shaft, and means for operatively connecting said shafts one with the other.

6. In a dirigible headlight mechanism, an elongated member adapted to extend transversely to the frame of an automobile, means for slidably connecting one end of said transverse member with said frame and for holding the same normally against sliding movement, and means controlled by the sliding movement of said transverse member for detachably connecting the other end thereof with said frame, a headlight pivotally mounted on said transverse member, and an operating device for said headlight comprising two parts, one of which is carried by said transverse member, and means to normally connect the two parts of said device and to permit the same to be disconnected when the last mentioned end of said transverse member is disconnected from said frame.

7. In a dirigible headlight mechanism, an elongated member, adapted to extend transversely to the frame of an automobile, means for pivotally and slidably connecting one end of said transverse member with said frame and for holding the same normally against sliding movement, means controlled by the sliding movement of said transverse member for detachably connecting the other end thereof with said frame and holding the same against pivotal movement, a headlight pivotally mounted on said transverse member, and an operating device for said headlight comprising two parts one of which is carried by said transverse member, and means controlled by the sliding movement of said transverse member to connect and disconnect said parts of said operating device.

8. In a dirigible headlight mechanism, an elongated member adapted to extend transversely to the frame of an automobile, means for pivotally and slidably connecting one end of said transverse member with said frame and holding the same normally against movement with relation to said frame, the other end of said transverse member being tubular, a member having means for supporting the same on said frame adjacent to the tubular end of said transverse member and having a part adapted to enter said tubular end of said transverse member and support the same, a headlight mounted on said transverse member for movement about a vertical axis, and an operating device for said headlight comprising a part mounted in said tubular portion of said transverse member for longitudinal movement therewith, and a second part mounted on the member which supports the tubular end of said transverse member, and means controlled by the sliding movement of said transverse member to connect and disconnect said parts of said actuating device.

9. In a dirigible headlight mechanism, supporting members having means for mounting the same on the frame of an automobile, one of said members being capable of pivotal movement, a tubular transverse member, means for slidably connecting said transverse member with said movable supporting member and for holding the same normally against sliding movement, a tube carried by the other of said supporting members, a connecting member mounted in said tube, projecting beyond the inner end thereof and adapted to enter the adjacent end of said tubular transverse member, a headlight pivotally mounted on said transverse member, and an operating device for said headlight comprising a part mounted in said tubular transverse member for longitudinal movement therewith, and a second part carried by the last mentioned supporting member and extending into said tubular transverse member, and means controlled by the sliding movement of said transverse member to connect and disconnect the two parts of said actuating device.

10. In a dirigible headlight mechanism, supporting members having means for mounting the same on the frame of an automobile, one of said supporting members comprising a sleeve capable of pivotal movement with relation to said frame, a transverse member having one end slidably mounted in said sleeve and held normally against movement with relation thereto, the other end of said transverse member and the other of said supporting members having parts arranged to be brought into and out of supporting engagement one with the other by the longitudinal movement of said transverse member, a headlight pivotally mounted on said transverse member, an operating shaft for said headlight mounted on said transverse member for longitudinal movement therewith, a second shaft mounted on the last mentioned supporting member, and means controlled by the sliding movement of said transverse member to connect and disconnect said shafts.

In testimony whereof, I affix my signature hereto.

GEORGE S. KECK.